United States Patent Office 2,945,852
Patented July 19, 1960

2,945,852

17-OXYGENATED 9α-SUBSTITUTED ANDROSTANO[3,2-c]PYRAZOLES AND DERIVATIVES

Clarence G. Bergstrom, Chicago, Ill., assignor to G. D. Searle & Co., Chicago, Ill., a corporation of Delaware No Drawing. Filed May 20, 1959, Ser. No. 814,382

8 Claims. (Cl. 260—239.5)

The present invention relates to novel 9-substituted steroids which contain a pyrazole ring fused at the 2, 3 position and to derivatives thereof. These compounds, more specifically, are 17-oxygenated 9α-substituted androstano[3,2-c]pyrazoles and closely related substances derived therefrom, and can be represented by the structural formula

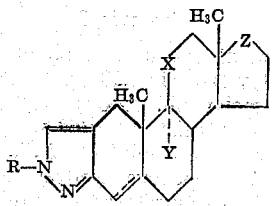

wherein R is hydrogen or a lower alkanoyl radical; Y is a member of the group consisting of halogen atoms of atomic weight less than 100 and an hydroxyl radical; Z is a member of the group consisting of carbonyl, β-hydroxymethylene, β-lower alkanoyloxymethylene, α-(lower alkyl)-β-hydroxymethylene, and α-(lower alkyl)-β-(lower alkanoyloxy)methylene radicals; X is selected from the group consisting of β-halomethylene, β-(lower alkanoyl)oxymethylene, and carbonyl radicals; and the dotted line indicates, as is known to those skilled in the art, that the linkage between carbon atoms 4 and 5 is optionally singly or doubly bonded.

A suitable starting material for the manufacture of the 9α-hydroxy- and the 9α-halo-17-oxygenated androst-4-ena[3,2-c]pyrazoles represented by the structural formula shown supra is 9α-hydroxyandrost-4-ene-3,17-dione. The latter diketone is treated with sodium borohydride in aqueous methanol to yield 9α,17β-dihydroxyandrost-4-en-3-one. Condensation of the latter substance in benzene with ethyl formate in the presence of sodium hydride yields 9α,17β-dihydroxy-2-hydroxymethyleneandrost-4-en-3-one which can be reacted with hydrazine to afford 9α,17β-dihydroxyandrost-4-ene[3,2-c]pyrazole. Oxidation of the latter diol, typically by means of chromium trioxide in pyridine, results in 9α-hydroxy-17-ketoandrost-4-ena-[3,2-c]pyrazole whereas treatment with a lower alkanoic acid anhydride in pyridine affords the N-(lower alkanoyl)-17β-(lower alkanoyl)oxyandrost-4-ena-[3,2-c] pyrazoles. These diesters can be converted to the 17β-(lower alkanoyl)oxyandrost-4-ena[3,2-c]pyrazoles by partial hydrolysis, for example by treatment with aqueous sodium hydroxide in methanol. The reaction of 9α,17β-dihydroxyandrost-4-ena[3,2-c]-pyrazole with a hydrohalogen acid yields the aforementioned 17-oxygenated 9α-haloandrost-4-ena[3,2-c]pyrazoles together with 17β-hydroxyandrosta-4,9(11)-diena[3,2-c]pyrazole. These 9α-halo compounds may be converted to derivatives containing all of the structural modifications shown above for the corresponding 9α-hydroxy analogs.

The aforementioned 9α,17β-dihydroxyandrost-4-en-3-one is reduced, preferably with lithium in liquid ammonia, resulting in 9α,17β-dihydroxyandrostan-3-one. This dihydroxy ketone may be reacted as demonstrated supra to afford the corresponding 9α-hydroxy- and 9α-halo-17-oxygenated androstano[3,2-c]pyrazoles.

The 9,11-dihalo and 9-halo-11-oxygenated compounds of this invention originate from the aforementioned 17β-hydroxyandrosta-4,9(11)-diena[3,2-c]pyrazole and its dihydro derivative, 17β-hydroxyandrost-9(11)-ena-[3,2-c] pyrazole. Reaction of the latter olefins with chlorine or bromine yields the corresponding 9α,11β-dichloro and 9α,11β-dibromo derivatives. On the other hand, reaction of the 9(11)-dehydro compounds with hydrogen fluoride and N-bromoacetamide or with hydrogen fluoride and N-chlorosuccinimide affords the 9α-bromo-11β-fluoro and 9α-chloro-11β-fluoro analogs, respectively.

The 9α-halo-11-oxygenated pyrazoles of this invention are also derived from the aforementioned 9(11)-dehydro intermediates. Reaction of the latter olefins with N-bromoacetamide in the presence of perchloric acid yields the 9α-bromo-11β-hydroxy derivatives. These compounds can be dehydrobrominated to the 9β,11β-epoxides, for example by treatment with aqueous sodium carbonate in an inert solvent such as tetrahydrofuran. These epoxides are then cleaved by reaction with hydrogen chloride in an organic solvent medium or with anhydrous hydrogen fluoride in a suitable medium to afford the corresponding 9α-chloro-11β-hydroxy and 9α-fluoro-11β-hydroxy compounds. Oxidation of the latter alcohols, as exemplified by reaction in pyridine with chromium trioxide, yields the 11,17-diketo substances of this invention. The 17-keto group of the latter diketones can be preferentially reduced, typically by reaction with sodium borohydride, to afford the corresponding 17β-hydroxy-11-keto compounds.

The 17-alkyl-17β-hydroxy substances of this invention are obtained by addition of the lower alkyl magnesium halides to the corresponding 17-ketone followed by decomposition of the resulting Grignard addition product. As a specific example of this process, 9α-hydroxy-17-ketoandrostano[3,2-c]pyrazole is reacted with methyl magnesium bromide in ether and the resulting addition product hydrolyzed with dilute hydrochloric acid to yield 9α,17β-dihydroxy-17α-methylandrostano[3,2-c]pyrazole.

The pyrazoles of this invention are useful as result of their valuable pharmacological properties. They are for example, anabolic agents as typified by their nitrogen-retaining activity. Such compounds, as is evident to persons skilled in the art, are effective in promoting muscle growth. At the same time, the instant compounds do not possess the potent androgenic side effects of prior art compositions adapted to anabolism enhancement.

The invention will appear more fully from the examples which follow. These examples are set forth by way of illustration only and it will be understood that the invention is not to be construed as limited in spirit or in scope by the details contained therein, as many modifications in materials and methods will be apparent in this disclosure to those skilled in the art. In these examples temperatures are given in degrees centigrade (° C.). Quantities of materials are expressed in parts by weight unless otherwise noted.

Example 1

To a stirred solution of 5 parts of 9α-hydroxyandrost-4-ene-3,17-dione and one part of sodium hydroxide in 800 parts of methanol is added at 2–4°, a solution of one part of sodium borohydride in 20 parts of water. The reaction mixture is stirred at 2–4° for one hour then neutralized with 10 parts of acetic acid. The mixture is distilled to remove the methanol then diluted with water and the resulting precipitate collected by filtration. This solid is dissolved in a 20% ethyl acetate- 80% benzene solution and adsorbed on silica gel. Elution of the column with a 35% ethyl acetate–65% benzene solution followed by crystallization from an acetone-cyclohexane solution yields 9α,17β-dihydroxyandrost-4-en-3-one. This product melts at 198–200°; [α]$_D$=+104°.

*Example 2*

To a stirred solution of 0.1 part of lithium in 100 parts of anhydrous liquid ammonia is added dropwise a solution of one part of 9α,17β-dihydroxyandrost-4-en-3-one in a mixture of 10 parts of ether and 10 parts of dioxane. The reaction mixture is then treated with 5 parts of ammonium chloride and the ammonia allowed to evaporate. The residue is treated with 100 parts of ether and 50 parts of water and the organic layer separated and washed with water to neutrality. The ether solution is dried over anhydrous sodium sulfate and concentrated to dryness in vacuo. Crystallization of the residue from acetone-hexane yields pure 9α,17β-dihydroxyandrostan-3-one, M.P 219–221.5°; [α]$_D$=+13.5°.

*Example 3*

To a solution of one part of 9α,17β-dihydroxyandrost-4-en-3-one in 30 parts of benzene is added 0.08 part of sodium hydride and 2 parts of ethyl formate, and the mixture is stirred in a nitrogen atmosphere for 2 days. The reaction mixture is then treated with 25 parts of an 80% ether-20% methanol solution in order to destroy the excess sodium hydride. The resulting precipitate is collected by filtration and dissolved in a mixture of 50 parts of ether and 25 parts of dilute hydrochloric acid. The organic layer is separated, washed with water, dried over anhydrous sodium sulfate, and concentrated to dryness under reduced pressure. Recrystallization of the residue from acetone-hexane results in pure 9α,17β-dihydroxy - 2-hydroxymethyleneandrost-4-en-3-one whose infrared absorption spectrum possesses maxima at 2.8, 6.1, and 6.3 microns.

By substituting 9α,17β-dihydroxyandrostan-3-one and reducing the reaction time to 16 hours, but otherwise proceeding according to the herein described process, 9α,17β-dihydroxy-2-hydroxymethyleneandrostan-3-one is obtained.

*Example 4*

A mixture of one part of 9α,17β-dihydroxy-2-hydroxymethyleneandrostran-3-one, 0.1 part of anhydrous hydrazine, and 20 parts of methanol is heated at reflux for 2 hours. The crystals which separate upon cooling are collected by filtration and recrystallized from ethanol to afford pure 9α,17β-dihydroxyandrostano[3,2-c]-pyrazole which exhibits maxima in the infrared at 2.76 and 6.26 microns.

*Example 5*

A mixture of one part of 9α,17β-dihydroxyandrostano [3,2-c]pyrazole and 10 parts of a 70% hydrogen fluoride-30% pyridine solution is allowed to stand at room temperature for 4 hours. The reaction mixture is then treated with 100 parts of methylene chloride and 200 parts of aqueous potassium carbonate. The aqueous layer is separated and washed with methylene chloride; then the organic extracts combined, dried over anhydrous sodium sulfate, and concentrated to a small volume in vacuo. The residue is adsorbed on a silica gel chromatographic column and eluted with an ethyl acetate-benzene solution to afford 17β-hydroxyandrost-9(11)-ena [3,2-c]pyrazole which possesses an ultraviolet absorption maximum at 221 millimicrons with an extinction coefficient of 4700. Infrared maxima are observed at 2.8 and 6.3 microns.

*Example 6*

Further elution of the chromatographic column referred to in Example 5, with an ethyl acetate-benzene solution yields 9α-fluoro-17β-hydroxyandrostano[3,2-c] pyrazole which displays an ultraviolet absorption maximum at 219 millimicrons with extinction coefficient of 4,750. In the infrared, maxima are observed at 2.8 and 6.2 microns.

*Example 7*

To a mixture of one part of chromium trioxide and 10 parts of pyridine is added a solution of one part of 9α-fluoro-17β-hydroxyandrostano[3,2-c]pyrazole in 10 parts of pyridine and the mixture allowed to stand for 16 hours at room temperature. It is then treated with 100 parts of a 50% benzene in ether solution and 50 parts of water. The organic layer is separated, washed with water, dried over anhydrous sodium sulfate, and concentrated to dryness at reduced pressure. Recrystallization of the residue from acetone-hexane results in pure 9α-fluoro-17-ketoandrostano[3,2-c]pyrazole which exhibits maxima in the infrared at 3.1, 5.7, 6.2, and 11.3 microns.

By substituting 9α,17β-dihydroxyandrostano[3,2-c] pyrazole and otherwise proceeding according to the herein described processes, 9α - hydroxy-17-ketoandrostano [3,2-c]pyrazole is obtained.

*Example 8*

To a solution of one part of 9α-hydroxy-17-ketoandrostano[3,2-c]pyrazole in 200 parts of ether is added 20 parts of a 1 molar solution of methyl magnesium bromide in ether and the mixture heated at reflux for 4 hours. It is then treated with a mixture of dilute hydrochloric acid and ice and the aqueous layer separated and washed with ether. The combined organic solutions are washed with water, dried over anhydrous sodium sulfate, and evaporated to dryness under reduced pressure. The residue can be crystallized from ethanol to afford pure 9α, 17β - dihydroxy - 17α-methylandrostano[3,2-c]pyrazole. This substance displays a maximum in the ultraviolet at 211 millimicrons with an extension coefficient of 5100 and also exhibits infrared maxima at 2.9, 3.1, 6.3, and 11.3 microns.

By substituting an equivalent quantity of 9α-fluoro-17-ketoandrostano[3,2-c]pyrazole and otherwise proceeding according to the herein described processes, 9α-fluoro-17β-hydroxy-17α-methylandrostano[3,2-c]pyrazole is obtained.

*Example 9*

To a solution of 2 parts of 9α-hydroxy-17-ketoandrostano[3,2-c]pyrazole in 400 parts of ether is added 50 parts of a 1 molar ethereal solution of ethyl magnesium bromide, and the mixture heated at reflux for 6 hours. The reaction mixture is poured cautiously into ice-cold dilute hydrochloric acid in order to hydrolyze the addition product, and the aqueous layer separated and washed with ether. The ether extracts are combined, dried over anhydrous sodium sulfate, and evaporated to dryness in vacuo to yield 9α,17β-dihydroxy-17α-ethylandrostano[3, 2-c]pyrazole. The pure material can be obtained by recrystallization from ethanol.

Substitution of an equivalent quantity of 9α-fluoro-17-ketoandrostano[3,2-c]pyrazole in the instant process results in 9α-fluoro-17β-hydroxy-17α-ethylandrostano-[3,2-c]pyrazole.

*Example 10*

A mixture of one part of 9α,17β-dihydroxy-17α-methylandrostano[3,2-c]pyrazole, 10 parts of pyridine, and 5 parts of acetic anhydride is allowed to stand at room temperature for 16 hours, then diluted with water. The resulting precipitate is isolated by filtration and recrystallized from ethanol to afford 17β-acetoxy-N-acetyl-9α-hydroxy-17α-methylandrostano-[3,2-c]pyrazole which exhibits maxima in the ultraviolet at 258 millimicrons with extinction coefficient of 18,500.

Example 11

A mixture of one part of N,17β-diacetoxy-9α-hydroxy-17α-methylandrostano[3,2-c]pyrazole, 100 parts of methanol and 3.1 parts of 1 Normal sodium hydroxide is heated at reflux for 30 minutes, then acidified with acetic acid and concentrated under reduced pressure. Dilution of the residue with water yields a precipitate which is isolated by filtration and crystallized from ethanol to afford pure 17β-acetoxy-9α-hydroxy-17α-methylandrostano[3,2-c]pyrazole. This ester exhibits maxima in the infrared at 2.9, 3.1, 5.8, and 6.2 microns and also a maximum in the ultraviolet at 224 millimicrons with extinction coefficient of 4,800.

What is claimed is:

1. A compound of the structural formula

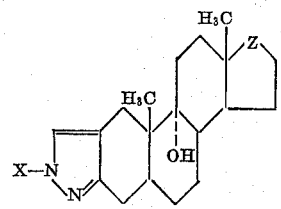

wherein X is selected from the group consisting of hydrogen and lower alkanoyl radicals and Z is selected from the group consisting of carbonyl, β-hydroxymethylene, α-(lower alkyl)-β-hydroxymethylene, and α-(lower alkyl)-β-(lower alkanoyl)-oxymethylene radicals.

2. A compound of the structural formula

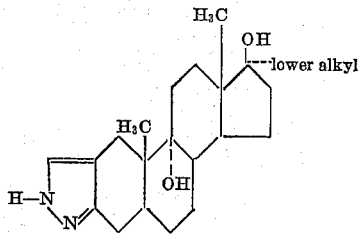

3. A compound of the structural formula

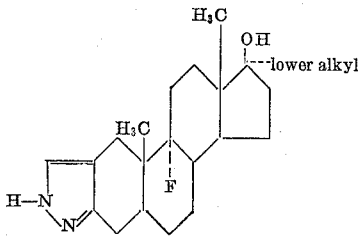

4. 9α,17β-dihydroxy-17α-methylandrostano-[3,2-c]pyrazole.

5. 9α-fluoro-17β-hydroxy-17α-methylandrostano-[3,2-c]pyrazole.

6. 9α,17β-dihydroxyandrostano[3,2-c]pyrazole.

7. 9α-fluoro-17β-hydroxyandrostano[3,2-c]-pyrazole.

8. A compound of the structural formula

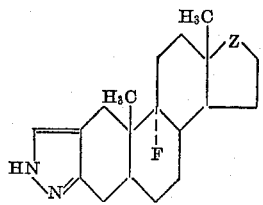

wherein Z is selected from the group consisting of carbonyl, β-hydroxymethylene, and α-(lower alkyl)-β-hydroxymethylene radicals.

References Cited in the file of this patent

"Journal of American Chemical Society," vol. 81 (1959), article by Clinton et al., pages 1513–1514.